Patented Dec. 13, 1949

2,491,160

UNITED STATES PATENT OFFICE 2,491,160

PRODUCTION OF DICHLORODIPHENYL-TRICHLOROETHANE

Everett A. Bruce, Paoli, Pa., and Charles W. Hagerman, New Castle, Ind., assignors to The Pennsylvania Salt Manufacturing Company, Philadelphia, Pa., a corporation of Pennsylvania No Drawing. Application July 21, 1945, Serial No. 606,478

13 Claims. (Cl. 260—649)

1

This invention relates to a process for production of 2,2-bis(p-chlorophenyl)-1,1,1-trichloroethane in friable solid form.

2,2 - bis(p - chlorophenyl) - 1,1,1 - trichloroethane, also known as dichlorodiphenyltrichloroethane or DDT, is a synthetically produced organic material which may be made, for example, by condensing chlorobenzene with chloral. The dichlorodiphenyltrichloroethane product of such synthesis is generally recovered in the form of a melt which is then solidified, e. g. in cooling pans, to the waxy solid which is the characteristic form of this material now available. The waxy nature of this material is particularly pronounced in the so-called technical grade solid, the immediate product of the synthesis procedure, and in various partially refined dichlorodiphenyltrichloroethane products. It may be that small amounts of isomeric compounds and other compounds formed in side reactions during the synthesis of the dichlorodiphenyltrichloroethane accentuate the tendency of the product to become waxy in its solid form. In any event, the waxy character of dichlorodiphenyltrichloroethane, particularly in the material which is not of the highest purity, raises many problems in processing and handling. The grinding of this material, for example, is particularly difficult and in the past it has been common to mix the material with solid carbon dioxide in order to chill the waxy solid to a temperature where it becomes brittle, and then grind this mixture of chilled dichlorodiphenyltrichloroethane and solid carbon dioxide. Such grinding operations obviously require special equipment and are costly to carry out.

We have now discovered that a dichlorodiphenyltrichloroethane product which would normally be obtained as a non-friable solid may be produced in a very desirable friable solid form by rapidly cooling said dichlorodiphenyltrichloroethane product from a temperature above its setting point (i. e. above about 90° C.), preferably above about 110° C., to a temperature below about 60° C., preferably to a temperature within the range of about 20–60° C., most advantageously 35° to 55° C., and subjecting the material to agitation at least during the initial stages of solidification. It is important that the cooling of the material through the range of about 90° C. to about 60° C. should be effected in not more than about 10 minutes' time, preferably not more than 5 minutes' time. The desired friable form of the solid material is obtained most advantageously when vigorous agitation is maintained throughout the cooling and solidification process and when the

2 heat transfer medium by which the rapid cooling is effected is held within the temperature range of about 35–55° C. until solidification is complete.

The process of the invention is applicable to any dichlorodiphenyltrichloroethane product which, when cooled from a molten state by the usual method of relatively slow cooling in a pan without agitation, forms a solid at ordinary temperatures that does not have sufficient friability to be ground from lump form to 20 to 100 mesh particle size in a hammermill at ordinarily prevailing temperatures. Such a material is referred to herein as "normally non-friable" dichlorodiphenyltrichloroethane. As used herein, the expressions "dichlorodiphenyltrichloroethane," "dichlorodiphenyltrichloroethane product" and "dichlorodiphenyltrichloroethane material" all denote products in which 2,2-bis(p-chlorophenyl)-1,1,1-trichloroethane is the predominant and important constituent, but which may contain minor amounts of other substances. In the claims the expressions "2,2-bis(p-chlorophenyl)-1,1,1-trichloroethane material" and "2,2-bis(p-chlorophenyl)-1,1,1-trichloroethane product" are used in the same sense. As above pointed out, the somewhat impure technical grade dichlorodiphenyltrichloroethane obtained as the immediate product of synthesis, and containing about 70 to 85% by weight 2,2-bis(p-chlorophenyl)-1,1,1-trichloroethane, is particularly waxy and non-friable when solidified by usual means, and the process of our invention is particularly advantageous for producing such material in a desired friable form. The process of our invention, however, is also applicable to other dichlorodiphenyltrichloroethane products, e. g. less pure and also partially purified dichlorodiphenyltrichloroethane ranging from as low as 50% up to 90% by weight 2,2 - bis(p - chlorophenyl) - 1,1,1 - trichloroethane content, whenever such products come within the class of normally non-friable materials as hereinabove defined.

In a preferred method of carrying out the process of our invention, a normally non-friable dichlorodiphenyltrichloroethane in molten form is rapidly cooled through the temperature range of about 90° C. to about 60° C., preferably 110° C. to 60° C., by pouring the melt into a body of water of sufficient quantity and of adequately low temperature to cool the dichlorodiphenyltrichloroethane to a temperature below 60° C. within about five minutes or less, the body of water and dichlorodiphenyltrichloroethane being vigorously agitated during said cooling. The dichlorodiphenyltrichloroethane is thus transformed into the desired friable product, usually obtained in the form of large lumps. The water is thereafter separated from the lump product, e. g. by decantation or filtration.

In the process of our invention the dichlorodiphenyltrichloroethane may be rapidly cooled to any desired temperature below about 60° C., and the material will eventually be transformed to the very desirable friable form described. We have found, however, that it is most advantageous to cool the dichlorodiphenyltrichloroethane rapidly to a temperature only slightly below 60° C., e. g. a temperature in the range of about 35° to 55°, and maintain the material at this somewhat elevated temperature just below about 60° C. until conversion to the friable product is complete. The reason for this is that the normally non-friable dichlorodiphenyltrichloroethane, when it is first brought to a temperature below about 60° C. by rapid cooling, apparently first forms a gummy or taffy-like mass which, without further processing (except for maintenance of the temperature below about 60° C.), changes over to the desired friable product. This transformation occurs much more rapidly at temperature just under about 60° C., e. g. at 35° to 55° C., than at the usual atmospheric temperature. For example, at 40° C. the gummy material changes over to the friable form in about one to three minutes, at 20° C. the transformation takes about twenty to thirty minutes, and at 0° C. about six to eight hours. Accordingly, maintenance of the material at the somewhat elevated temperatures indicated represents preferred operation. It should be appreciated, however, that the important step, making possible the eventual recovery of a friable product, is the rapid cooling, with at least initial agitation, from a temperature above the setting point to below about 60° C.

As above stated, the friable dichlorodiphenyltrichloroethane product is generally recovered as a solid of lump form. We have found that this solid material is surprisingly of such a friable character that it may readily be ground at ordinary temperatures by the usual types of grinders, e. g. jaw crushers, knife mills, hammermills, etc., to a powder of 60 to 100 mesh particle size, which powder may be stored and handled without undue caking. Either before or after grinding, the solid is dried, preferably by heating, with circulation of air, at a temperature below about 60° C., preferably below 55° C.; this temperature limitation is important, since the friable solid, when heated, is transformed to the known waxy form of product at a temperature in the neighborhood of 60° C.

The friable material, and especially the finely ground powder form in which it is readily produced, is most advantageous for agricultural uses, e. g. in the compounding of insecticidal dust mixtures. It is especially significant from the standpoint of agricultural economy that the well known technical grade dichlorodiphenyltrichloroethane which has heretofore been produced only as a solid of pronounced waxy character can, by the process of our invention, be produced in this desirable friable form which is easily converted to a powder of substantially lower caking tendency.

Instead of water, any inert heat transfer medium, solid, liquid, or gaseous, may be employed in the process of our invention for rapidly cooling the dichlorodiphenyltrichloroethane melt through the indicated temperature range, provided suitable provision is made to observe cooling time and agitation requirements. Thus, the melt may be poured onto the surface of a solid mass, e. g. a block of metal such as copper (which is capable of rapidly conducting the heat away from the dichlorodiphenyltrichloroethane), of suitably low temperature, with agitation by means of scrapers or other devices. Similarly the dichlorodiphenyltrichloroethane melt may be cooled rapidly by spraying it into an inert fluid medium of suitably low temperature, provided the cooling is rapid and means are adopted to agitate the dichlorodiphenyltrichloroethane vigorously at least during the initial stages of the solidification. Thus, inert liquids other than water in which the dichlorodiphenyltrichloroethane is substantially insoluble may be employed as heat transfer media; examples include organic liquids such as ethanol previously saturated with dichlorodiphenyltrichloroethane, aqueous liquids such as 80% ethanol solution in water, and mercury.

Water, however, is the preferred heat transfer medium for the process of our invention, since it is the most readily available inert material, is easily handled, presents little or no corrosion problem and presents no difficulties so far as agitation is concerned. Moreover, wet grinding of the granular dichlorodiphenyltrichloroethane is considered an advantageous method of pulverizing the product to a desired powdered form, and such grinding process may logically be associated with our preferred water-casting method of solidifying dichlorodiphenyltrichloroethane. Employing water-casting, any drying operation may be postponed until after the dichlorodiphenyltrichloroethane product has been ground to a powder. It is possible, moreover, that when water is used as the heat transfer medium for solidification of technical grade dichlorodiphenyltrichloroethane, the water may accomplish some slight degree of purification of the product.

The following example is illustrative of the process of the invention:

Molten dichlorodiphenyltrichloroethane product of technical grade was produced by condensing chloral with chlorobenzene, using sulfuric acid as a catalyst. The reaction product was then processed by separating the acid, washing the crude dichlorodiphenyltrichloroethane (DDT) with water, neutralizing the remaining acid, and then steam distilling off the unreacted raw materials.

Sixty parts by weight of the molten technical grade dichlorodiphenyltrichloroethane thus produced, maintained at a temperature of about 110° C., were poured with vigorous agitation into a body of 100 parts by weight of water which was initially at a temperature of about 40° C. and rose to a temperature of about 50° C. during cooling and solidification of the DDT. Agitation was maintained for two minutes until solidification was complete. The lumpy product thus produced was subdivided to 20 to 100 mesh size in ordinary crushing and grinding equipment, i. e. first employing a rotary knife cutter and then a hammer mill cooled and lubricated internally with tap water. The slurry from the final grinding step was dewatered in stages, first by filtering and then drying in an air dryer at a temperature under 135° F. (57° C.).

Both the granular product first produced by the solidification in water and the finely ground powder product eventually separated, when dried, had the characteristics and "feel" of a friable solid and appeared to be substantially non-waxy in character. A sample of the same molten dichlorodiphenyltrichloroethane product, however, when solidified by the usual method in a pan and thereafter broken into lumps or otherwise subdivided, had the appearance of a wax and was entirely non-friable in character.

Since many modifications are possible in the process of our invention as above described without departing from the scope of the invention, it is intended that the above description of our invention should be interpreted as illustrative, and the invention is not to be limited except as set forth in the claims which follow.

We claim:

1. The method of producing a friable solid product from a normally non-friable DDT material which comprises cooling said material within a period of not more than ten minutes from a temperature above its setting point to a temperature below about 60° C. and thereafter maintaining the material below about 60° C. until solidification is complete, the material being subjected to agitation at least during the initial stages of its solidification.

2. The method of producing a friable solid product from a normally non-friable technical grade DDT material containing from about 70% to 85% by weight DDT, comprising cooling said material within a period of not more than about 5 minutes from a temperature above about 110° C. to a temperature below about 60° C., agitating said material at least during the initial stages of its solidification, and maintaining the material within the temperature range of about 20° to about 60° C. until conversion of the material to a friable product is complete.

3. In a method of producing a friable solid form of a normally non-friable DDT product, the steps that comprise pouring a melt of said product into a body of water, with agitation, to cool the product through the temperature range from about 90° C. to about 60° C. within a period of not more than about 10 minutes, and maintaining the body of water containing the DDT product at a temperature below about 60° C. until conversion to the friable solid form it complete.

4. In a method of producing a friable solid form of technical grade DDT product, made by condensation of chlorobenzene with chloral, the steps that comprise pouring a melt of the technical grade product thus produced into a body of water, with agitation, to cool the product through the temperature range of about 110° C. to 60° C. within a period of not more than about 5 minutes, and maintaining the body of water containing the DDT product at a temperature within the range of about 20° C. to about 60° C. until conversion to the friable solid form is complete.

5. The process of solidifying DDT (dichlorodiphenyltrichloroethane) in hard crystalline form which includes cooling molten DDT quickly to a temperature below about 60° C., and initiating solidification of the DDT during agitation thereof.

6. The method of producing a friable solid product from a technical DDT material which comprises bringing said material in the molten state into intimate contact with a heat exchange medium maintained at a temperature below about 60° C., to cool said material rapidly from a temperature above about 90° C. and above the temperature at which the material is molten to a temperature below about 60° C., and thereafter substantially maintaining the material below about 60° C. until solidification is complete, the material being subjected to agitation at least during the initial stages of its solidification.

7. The method of producing a friable solid product from a normally non-friable DDT material which comprises intimately contacting the molten DDT material with an inert fluid medium to cool the material rapidly from above its setting point to below about 60° C., and agitating at least while initiating solidification, and thereafter bringing about complete solidification of the material.

8. The method of producing a friable solid product from a technical DDT material which comprises spraying the molten material into an inert fluid medium with at least initial agitation to effect intimate contact of the DDT with the inert fluid medium and initiate solidification while cooling the DDT within about two minutes from above its setting point to below about 60° C., and thereafter substantially maintaining the material below about 60° C. until solidification is complete.

9. The method of claim 2 in which the cooling is effected by contact of the material with a solid heat transfer surface.

10. The method of claim 1 in which the cooling is effected by contact of the material with a solid heat transfer surface.

11. The method of claim 6 in which the cooling is effected by contact of the material with a solid heat transfer surface.

12. The process of claim 5 in which the cooling is accomplished by direct contact of the DDT with a solid cooling medium.

13. The process of solidifying DDT in hard crystalline form which includes cooling molten DDT quickly to a temperature below about 60° C. and initiating solidification of the DDT by spraying the DDT into an inert fluid cooling medium.

EVERETT A. BRUCE.
CHARLES W. HAGERMAN.

REFERENCES CITED

The following references are of record in the file of this patent:

UNITED STATES PATENTS

| Number | Name | Date |
|---|---|---|
| 143,485 | Wood | Oct. 7, 1873 |
| 576,773 | Broderick | Feb. 9, 1897 |
| 2,064,487 | Miller | Dec. 15, 1936 |
| 2,329,074 | Muller | Sept. 7, 1943 |

OTHER REFERENCES

Callaham, "Chemical and Metallurgical Engineering," vol. 51, page 114 (1944).